(12) United States Patent
Giatilis et al.

(10) Patent No.: US 11,295,079 B2
(45) Date of Patent: Apr. 5, 2022

(54) COMPUTER-IMPLEMENTED METHOD AND SYSTEM FOR PROVIDING A REVIEW PROCESS OF A DOCUMENT

(71) Applicant: Unify Patente GmbH & Co. KG, Munich (DE)

(72) Inventors: Vasileios Giatilis, Palaio Faliro (GR); Lampros Pappas, Athens (GR)

(73) Assignee: Unify Patente GmbH & Co. KG, Munich (DE)

( * ) Notice: Subject to any disclaimer, the term of this patent is extended or adjusted under 35 U.S.C. 154(b) by 128 days.

(21) Appl. No.: 16/434,461

(22) Filed: Jun. 7, 2019

(65) Prior Publication Data
US 2020/0004814 A1    Jan. 2, 2020

(30) Foreign Application Priority Data
Jun. 27, 2018  (EP) ..................................... 18180215

(51) Int. Cl.
*G06F 40/232*  (2020.01)
*G06F 16/93*  (2019.01)
(Continued)

(52) U.S. Cl.
CPC .......... *G06F 40/232* (2020.01); *G06F 16/176* (2019.01); *G06F 16/93* (2019.01); *G06F 40/166* (2020.01); *G06F 40/242* (2020.01)

(58) Field of Classification Search
None
See application file for complete search history.

(56) References Cited

U.S. PATENT DOCUMENTS 5,307,262 A    4/1994  Ertel
5,659,771 A *  8/1997  Golding ................ G06F 40/232
                                                              715/257
(Continued)

FOREIGN PATENT DOCUMENTS

WO    2017218526 A1    12/2017

OTHER PUBLICATIONS

B. Meek K K Siu "The effectiveness of error seeding" CM SIGPLAN NoticesJun. 1989, 9 pages, https://doi.org/10.1145/71052.71064 (Year: 1989).*

(Continued)

*Primary Examiner* — Benjamin Smith
(74) *Attorney, Agent, or Firm* — Buchanan Ingersoll & Rooney PC (57) ABSTRACT

A method for providing a review process of a document can include receiving, at a document server, the document to be reviewed from a first client; providing, by the document server, access to the document to be reviewed via a second client to start the review process for a user of the second client. During and/or after the review process, the document server can evaluate the quality of the review process and provide information on the evaluated quality to the first client so that the user of the first client can receive an indication of how the review process has occurred or is occurring and have an indication of the quality of that review that is being performed or was performed. Embodiments of a communication apparatus and system for providing information on a review process of a document can be configured to utilize embodiments of the method.

16 Claims, 5 Drawing Sheets

(51) Int. Cl.
*G06F 40/166* (2020.01)
*G06F 16/176* (2019.01)
*G06F 40/242* (2020.01)

(56) References Cited

U.S. PATENT DOCUMENTS

| | | | |
|---|---|---|---|
| 5,706,452 A | 1/1998 | Ivanov | |
| 7,007,232 B1 | 2/2006 | Ross et al. | |
| 7,043,486 B2 | 5/2006 | Cope | |
| 7,337,124 B2 | 2/2008 | Corral | |
| 7,392,107 B2* | 6/2008 | Popp | G05B 23/0235 700/110 |
| 7,558,769 B2 | 7/2009 | Scott et al. | |
| 8,438,469 B1 | 5/2013 | Scott et al. | |
| 8,700,991 B1* | 4/2014 | Gigliotti | G06F 40/143 715/236 |
| 9,256,512 B1* | 2/2016 | Shiraishi | G06F 11/362 |
| 9,275,356 B2* | 3/2016 | Popp | G06Q 10/06 |
| 9,383,888 B2 | 7/2016 | Fish et al. | |
| 9,722,962 B2 | 8/2017 | Langholz | |
| 10,489,507 B2* | 11/2019 | Li | G06N 20/00 |
| 10,504,037 B1* | 12/2019 | Anant | G06F 16/24578 |
| 2005/0251278 A1* | 11/2005 | Popp | G06Q 10/06 700/110 |
| 2006/0271227 A1* | 11/2006 | Popp | G06Q 10/06 700/110 |
| 2007/0021856 A1* | 1/2007 | Popp | G16H 20/10 700/110 |
| 2007/0073532 A1* | 3/2007 | Brockett | G06F 40/253 704/9 |
| 2007/0088827 A1* | 4/2007 | Starbuck | G06Q 10/00 709/226 |
| 2007/0208880 A1* | 9/2007 | Lauper | H04M 3/4878 709/246 |
| 2008/0294361 A1* | 11/2008 | Popp | G06Q 50/04 702/81 |
| 2010/0063613 A1* | 3/2010 | Popp | G06Q 30/00 700/110 |
| 2011/0307495 A1* | 12/2011 | Shoshan | G06F 40/51 707/748 |
| 2013/0073072 A1* | 3/2013 | Popp | A23L 33/40 700/110 |
| 2013/0332242 A1 | 12/2013 | Arnaout et al. | |
| 2014/0278342 A1* | 9/2014 | Shoshan | G06F 40/40 704/2 |
| 2015/0199411 A1 | 7/2015 | Greenspan et al. | |
| 2015/0200893 A1 | 7/2015 | Harris et al. | |
| 2016/0378748 A1* | 12/2016 | Shoshan | G06Q 10/06395 704/2 |
| 2017/0024689 A1* | 1/2017 | Dufour | G06Q 10/08 |
| 2017/0061341 A1* | 3/2017 | Haas | G06Q 30/0283 |
| 2017/0093776 A1 | 3/2017 | Dixon | |
| 2017/0109346 A1* | 4/2017 | Shoshan | G06Q 10/063112 |
| 2017/0199862 A1* | 7/2017 | Litt | G06F 40/18 |
| 2017/0286416 A1 | 10/2017 | Gan et al. | |
| 2017/0323211 A1* | 11/2017 | Bencke | G06Q 10/0639 |
| 2018/0322193 A1* | 11/2018 | Agarwal | G06F 16/638 |
| 2019/0205372 A1* | 7/2019 | Li | G06N 20/00 |
| 2019/0392038 A1* | 12/2019 | Goutal | G06F 16/9024 |

OTHER PUBLICATIONS

ProfessionalQA.com "Error Seeding" Published Mar. 31, 2018 retrieved from web archive on May 18, 2021, 4 pages, https://web.archive.org/web/20180612103344/https://www.professionalqa.com/error-seeding (Year: 2018).*
European Search Report for EP18180215 dated Dec. 7, 2018.
Sara Schroter et al.: "What errors do peer reviews detect, and does training improve their ability to detect them?", Journal of The Royal Society of Medicine, vol. 101, No. 10, Oct. 1, 2008.
Anonymous: "A word for an international error or absurdity inserted to check whether audience read an entire passage—English Language & Usage Stack Exchange", Nov. 11, 2015, Retrieved from the Internet: URL:https://english.stackexchange.com/questions/286452/a-word-for-an-internation-error-or-absurdity-inserted-to-check-whether-audience.

* cited by examiner

COMPUTER-IMPLEMENTED METHOD AND SYSTEM FOR PROVIDING A REVIEW PROCESS OF A DOCUMENT

CROSS-REFERENCE TO RELATED APPLICATION

The present application claims priority to European Patent Application No. EP 18180215.8, filed on Jun. 27, 2018. The entirety of this patent application is incorporated by reference herein.

FIELD

The present invention deals with a computer-implemented method, apparatus, and system for providing a review process of a document.

BACKGROUND

In prior art, collaborative environments are known which, amongst others, allow users, for example, to ask other users, as other colleagues or services, for a review of a document. For example, a user has elaborated a technical document for which he or she needs feedback from other people that this technical approach is correct. For optimal results, the review process on the document may even be repeated for a couple of times.

Further, in prior art, many services in the applications domain are known that provide document collaboration environments. Some examples are Sharepoint provided by Microsoft, Google Docs provided by Google, etc. In such collaboration systems, a user may ask another user or even several other users for reviewing a document that he or she has drafted. Then, the selected reviewer or reviewers are enabled to access the document to be reviewed and to modify the document, for example, by adding comments or making corrections. Further, some collaborations systems or applications provide, for the reviewer or reviewers, a possibility for sending some kind of feedback to the user who created the document to be reviewed (in the following referred to the author or drafter) so as to notify him or her that the review process is completed. This, however, according to prior art applications, is the only information the author of the document to be reviewed will be able to receive on the review process.

SUMMARY

We have determined that, for the further editing of a document, it would be very beneficial for the author of the document to be reviewed to also receive an indication whether the reviewer has correctly, e.g. for example thoroughly, reviewed the document or not. Also, in a case where certain deadlines for submitting a document, as for example a paper or the like, have to be met, for the author who might already be pressed for time, also the progress of the review process might be essential information so as to plan the further processing.

Therefore, embodiments of our present invention can be based on the object to overcome the drawbacks in existing collaboration systems as outlined above. In particular, embodiments of the present invention can be based on the object to provide a computer-implemented method and a system for providing a review process of a document with the possibility of a feed-back. This object can be solved in embodiments of the present invention by use of an embodiment of a computer-implemented method for providing a review process of a document, a system for providing a review process of a document that can implement an embodiment of the method, and a communication apparatus that can be configured to implement an embodiment of the method. The communication apparatus can be an embodiment of the system or a component of an embodiment of the system.

Some embodiments of the method can be configured as a method for providing a review process of a document, which is provided by first client to at least one second client via a communications network to a document server where the document server comprises a central documentation system enabling document collaboration. Embodiments of the method can include: receiving, at the document server, the document to be reviewed from the first client; For example, the method can include utilization of a communication apparatus that can include a document server comprising a processor connected to a non-transitory computer readable medium. The document server can be connectable via a communications network to a first client, and can also be connectable via the communications network to a second client. The document server can be configured to receive a document from the first client. The document server can be configured to process the document to be reviewed that is received from the first client by creating a copy of the document to be reviewed and modifying the copy so the copy is a modified copy that includes predetermined typos and/or grammar errors. The document server can be configured to permit the second client to access the modified copy so as to start a review process for reviewing the document to be reviewed; determine a quality of the review process performed via the second client based on an extent to which the predetermined typos and/or grammar errors included in the modified copy are corrected via the second client during the review process, and transmit information related to the evaluated quality of the review process to the first client.

Embodiments of the method can permit the first user, (e.g. the author of the document to be reviewed), to be provided with information on the quality of the review process and thus, is enabled to evaluate whether the reviewer took a thorough look on the document to be reviewed or whether she or he just skimmed over the document.

According to a preferred embodiment, the method can also include processing the document to be reviewed prior to the step of providing access to the document. Preferably, the step of processing the document to be reviewed includes: creating a copy of the document to be reviewed and modifying the copy so as to comprise predetermined typos and/or grammar errors. By adding type-writing errors or grammar errors, the determination of whether a reviewer has read a document to be reviewed carefully or not can be made. Namely, for example, it may be determined how many of the added errors have been found by the reviewer and then have been corrected. If only few or no errors have been corrected in the reviewed document, then it is most likely that the reviewer has not made a good job and has only skimmed over the text, while overlooking the errors. If all or many errors have been corrected in the reviewed document, then, it may the reviewer has carefully read the document so that a good review quality will be assumed.

In some embodiments of the method, providing access to the document to be reviewed may include receiving log in data from the second client so as to log into the document server for accessing the document to be reviewed and starting the reviewing process. According to another preferred embodiment, the document server, upon receiving log-in data from the second client, provides access to the second client to the modified copy of the document to be reviewed. The original document to be reviewed will not contain the errors added by the document server and remains intact in this respect.

The document server (e.g. a computer device configured as a server that has at least one processor connected to a non-transitory computer readable medium and has at least one transceiver unit and/or interface for communicative connection to clients) can be configured to evaluate the quality of the review process by determining the number of typos and/or grammar errors detected and corrected in the modified copy by the second client. As mentioned above, the number of types and/or grammar errors provides an indication on the quality of the review process since the thoroughness of reading the text of the document to be reviewed can be deduced from this. Preferably, the typos and/or grammar errors are generated randomly. This can provide the advantage that, for example, in case of a reviewer being already used to the type of errors occurring in a document, the reviewer cannot foresee the latter so that he or she in this case will only make corrections, for example, at the expected passages in the text. Also, reviewers may not pass information on the type of added errors to other reviewers, who might shorten the review process to the expected passages, as mentioned above. According to still another preferred embodiment, the typos and/or grammar errors may also be generated on the basis of a reverse spelling check of the document to be reviewed, wherein the document server identifies past incorrectly written words automatically corrected by using the spelling check. The document server, when modifying the copy, can replace one or more of the thus corrected words by the original erroneous words. This may be advantageous in some embodiments because the reviewer will not get the impression of artificially added errors so that he or she might draw conclusions and reduce the corrections to these "artificial" errors by only reading the expected passages of the text. Rather, the text will appear natural and real, and the reviewer will not suspect that the quality of his or her work is monitored and assessed.

In some embodiments of the method, evaluating the quality of the review process may include determining the pace of reading of a reviewer of the document to be reviewed at the second client. The pace of reading may be detected, for example, by means of a reading pace detector implemented either in the document server or in the second client. By detecting the pace of reading of the reviewer, the state of completion of the review process may be determined as well which information may then be provided to the first client, namely, the author of the document to be reviewed. Thus, according to this embodiment it is enabled that whenever a review is requested, an indication will be provided to the author of the document to be reviewed of how far this review process has advanced and thus, whether it is progressing well or rather slow. The state of the review process can be very useful not only for the author of the document to be reviewed, but rather also, for example, to project management in an enterprise world in order to monitor the review process so as to be prepared for the date of document release. Since commonly a review is being performed by multiple parties, all statuses or states can be collected and consolidated into a final one that will enable the author of the document to be reviewed to view the overall review progress. Preferably, the document server can be configured to compare the pace of reading with predetermined values, in particular, with a predetermined range of values for the pace of reading, and if it is determined that the pace of reading lies within the predetermined range, then the quality of the review process is determined to be good, and if it is determined that the pace of reading lies outside of the predetermined range, then the quality of the review process is determined to be less good.

It can also be advantageous for some embodiments of the method to be configured so that the quality of the review process is determined continuously during the review process. For such embodiments, the result of the determination can be provided to the first client in real-time and updated in real-time.

According to yet another embodiment, the method can include determining the reading status, by the document server, during the review process, and indicating the reading status at the first client. Thus, embodiments of the method can permit the author of the document to be reviewed to always be provided with up-to-date status information on the progress of the review process so that he or she is enabled to better plan and organize his or her current work. Preferably, the determining of the reading status can be carried out based on the position of a scroll bar at a monitor of the second client indicating the position in the document to be reviewed. This can represent the simplest way of following the progress of the reading status. In other applications there also may be implemented, for example, a percentage indicator that, whenever the reader scrolls up or down, depicts the actual status. For example, in applications like Kindle Books provided by Amazon, the percentage of the reading status is shown constantly as the user changes pages. Thereby, an indication may be provided to the user of how far his or her reading has progressed. This indication, in turn, may be transmitted from the second client back to document server and then, the document server may inform the first client and thus, the author or drafter that the review has been progressed up to a certain level.

Embodiments of the method may also include receiving, at the document server, checkpoint tags set at the first client indicating a quantitative status of the document review. The checkpoints may be added or set in the document to be reviewed by the author himself, so that when the reviewer reaches them they may be switched on automatically or manually sending immediately a confirmation back to the author concerning the quantitative status of the document review. Further, the checkpoints may be set by the author at different points within the text of the document to be reviewed, thus, providing the opportunity to also provide a kind of ranking as to the importance of specific areas within the document. For example, the author may set more checkpoints at a section in the document that is important to be read, while setting fewer (or none) in a passage that is considered to need less. Checkpoints may also be activated and de-activated by the reviewer. For instance, the reviewer, if he or she thinks that a certain checkpoint has been set by the author erroneously or the author should reconsider it, then she or he may de-activate the checkpoint and cancel its status at author's side.

Moreover, a system for providing information on a review process of a document is provided. Embodiments of the system can include a document server comprising a central documentation system enabling document collaboration The document server can be connected via a communications network to a first client (document drafter) and a second server (document reviewer). Embodiments of the system can be configured to carry out embodiments of the method as outlined above and discussed herein. Embodiments of the inventive system can provide the advantages outlined above.

It should be appreciated that the document server can be a computer device that includes a processor connected to a non-transitory computer readable medium and at least one transceiver unit or interface for communicative connection to clients. The first client and second client can each be communication devices or communication terminals (e.g. smart phone, laptop computer, tablet device, desktop personal computer, etc.) that is a machine that includes a processor connected to a non-transitory computer readable medium and at least one transceiver unit (e.g. a wireless network interface, a near field communication interface, etc.) or can be configured as an applications stored on the computer readable medium of such a device for being run by the processor of the device.

Embodiments of the system can include a reading pace detector. It should be appreciated that the reading pace detector can be configured to assess the pace at which a document is being reviewed at a client.

A communication apparatus is also provided. Embodiments of the communication apparatus can be configured as an embodiment of the system or a component of the system (e.g. a client component of the system, or a document server of the system, etc.). For example, a document server connectable via a communications network to a first client and a second client can be configured to receive a document to be reviewed from the first client, process the document to be reviewed that is received from the first client by creating a copy of the document to be reviewed and modifying the copy so the copy is a modified copy that includes predetermined typos and/or grammar errors. The document server can be configured to permit the second client to access the modified copy so as to start a review process for reviewing the document to be reviewed, determine a quality of the review process performed via the second client based on an extent to which the predetermined typos and/or grammar errors included in the modified copy are corrected via the second client during the review process, and transmit information related to the evaluated quality of the review process to the first client.

Other details, objects, and advantages of the invention will become apparent as the following description of certain present preferred embodiments thereof and certain present preferred methods of practicing the same proceeds.

BRIEF DESCRIPTION OF THE DRAWINGS

The invention and embodiments thereof will be described below in further detail in connection with the drawings. It should be understood that like reference numbers used in the drawings may identify like components.

In the drawings, the following reference numerals are utilized for the listed elements shown in the drawings:
1 system for providing information on a review process of a document
2 document server
3 communications network
4 first client
5 second client
6 author/drafter
7 reviewer
8 means for introducing random typos
9 means for introducing grammar errors
10 means for introducing errors via reverse spelling check
11 document to be reviewed
12 copy of document to be reviewed
13 scroll bar
14 percentage indicator
15 checkpoint tag It should be appreciated that FIGS. 1-4 are schematic in nature. These Figures illustrate the first and second clients 4, 5 via a stick figure schematic illustration. But, it should be understood that the clients in these embodiments are electronic devices as discussed herein.

DETAILED DESCRIPTION OF EXEMPLARY EMBODIMENTS

Figure 1:
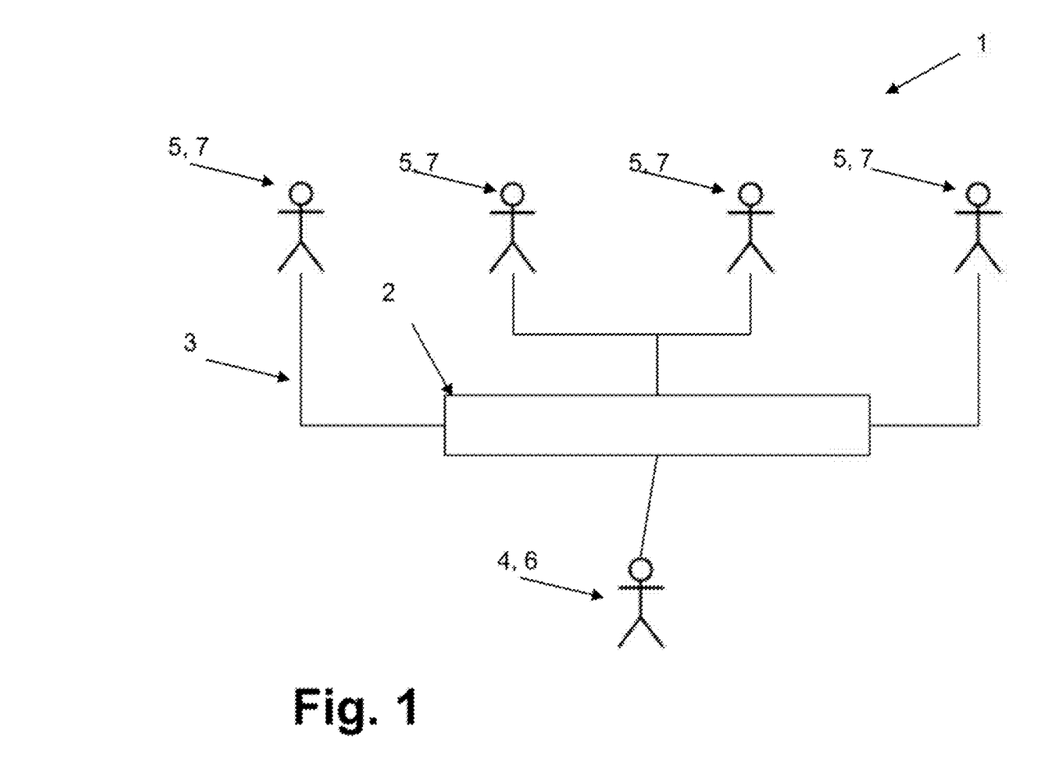
FIG. 1 shows a schematic overview of an exemplary embodiment of the system for providing information on a review process according to an embodiment of the invention.

FIG. 1 shows a schematic overview of the system for providing information on a review process 1 according to an embodiment of the invention. This embodiment assumes a server-client system in its simplest form in which the central document server 2 comprises a central documentation system that enables document-collaboration and is connected, via a communication network 3 to a first client 4 (as a computing device of an author 6 of a document to be reviewed) and to at least one further second client 5 (as a computing device of a reviewer 7 selected to review the document). It should be appreciated that the document server 2 can be a computer device configured as a server that has at least one processor connected to a non-transitory computer readable medium and has at least one transceiver unit and/or interface for communicative connection to clients via the communication network 3. Each client can be a computer device (e.g. a laptop computer, a smart phone, a desktop computer, a tablet, another type of communication terminal, another type of communication device, etc.) that includes at least one processor connected to a non-transitory computer readable medium and has at least one transceiver unit and/or interface for communicative connection to the document server 2 via the communication network 3.

The first client 4 and each second client 5 can include a display or be connected to a display (e.g. a monitor, a liquid crystal display, a touch screen display, etc.) so that a document is viewable and/or readable via the display. Each client can also include at least one input device (e.g. a touch screen display, a pointer device, etc.) or be connectable to such an input device to facilitate a user providing input to the client. A client can be configured to generate a display via its connection with the document server 2 so that a document to be reviewed is visible and reviewable by a reviewer 7 via the display of the second client 5 or display connected to the second client 5. A first client 4 can also be configured to generate a display via its connection with the document server 2 so that an author 6 can receive a status update indication that is generated as a displayable indication via the first client's connection to the document server 2. This generated display of the review status can be displayed via the display of the first client 4 or a display connected to the first client 4.

As can be seen, in this embodiment illustrated in FIG. 1, there are four second client devices 5, each of which being a computing device of a respective reviewer to review a document. The document server 2 allows the second client 5 or rather all second clients 5 which have been selected for reviewing a document to log into the document server 2 so as to access the document to be reviewed and modify it, for example, by making corrections or by adding comments, during the review process. The document server 2 further is adapted to send feedback to each client, either the first client 4 and/or the second client/s 5 concerning different statuses of the review process and also to receive feedback from the first and second clients 4,5.

Figure 2:
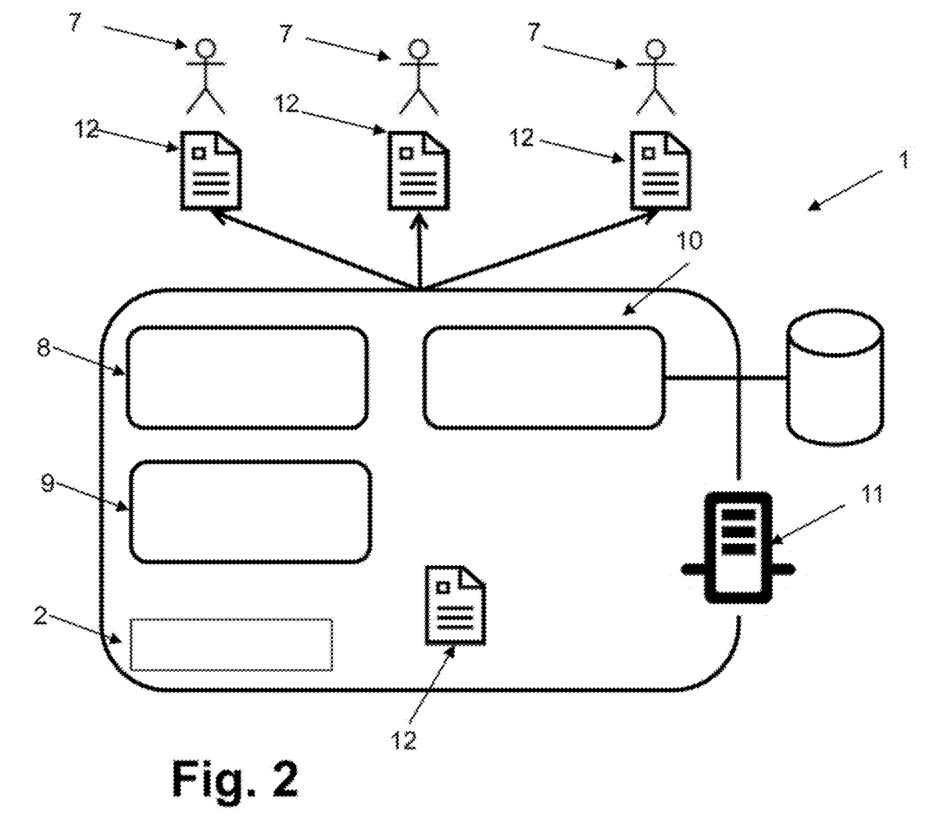
FIG. 2 shows a further schematic overview of the exemplary embodiment of the system for providing information on a review process according to another embodiment of the invention.

FIG. 2 shows a further schematic overview of the system for providing information on a review process 1 according to an embodiment of the invention. Here, when the author 6 of a document to be reviewed transmits this document 11 for review to the document server 2 via the first client 4, the document server 2 is adapted to process the document to be reviewed in order to ensure that the selected reviewers 7 will actually read the document 11 carefully via their second clients 5.

According to this embodiment, the document server 2 comprises means for introducing random typos 8 and/or means for introducing grammar errors 9 so as to be able to intentionally insert a predetermined number of typos and/or grammar error in the document to be reviewed 11. The means for providing such a function can be an application stored on non-transitory computer readable medium of the document server 2 that defines a process by which the document can be modified to include typos 8 and grammar errors 9 into the document to store the document as a modified document in the memory or other non-transitory computer readable medium of the document server 2 so that the stored, modified document is accessible to reviewers via their second clients 5 for review of the document. Thereby, when the reviewer 7, in fact, is diligent and carefully reads the text of the document to be reviewed 11, then she or he will find the errors and correct them. If not, then errors will remain uncorrected. The number of errors added to the document by the document server 2 that are corrected by a reviewer can provides an indication of the quality of the review process. The document server 2 can be configured so that the addition of such typos 8 and grammar errors 9 are identifiable and the correction of those typos 8 and errors 9 can be tracked for evaluating how many of these typos 8 and errors 9 were corrected by a reviewer via their second client 5 during the review of the document. A quality of the document review can be determined based on an extent to which the typos 8 and errors 9 were corrected by the reviewer.

For example, according to an embodiment of this procedure, the document server 2 can create a copy 12 of the document to be reviewed 11 and a list of intentional errors can be stored in a separate file along with the copy 12. When the review is finished (by a user action) or as the review advances via the second client 5, the changes performed by the reviewing user via the second client 5 are checked against the list of intentional errors. If a change is part of the intentional errors list it is not copied/merged to the original document. If the change is not part of the intentional errors list it is copied/merged to the original document.

The typos 8 and grammar errors 9 can be generated randomly, and they may be different for every reviewer 7 so that the reviewers 7 working on the same document will not be able to "cooperate" in this respect, for example, by one reviewer 7 telling the other reviewers 7 which errors to look out for. For example, the document server 2 may pick up some words randomly within the document and then introduce a random letter into the selected word or omit a letter from this word.

Further, the document server 2 can include a means for introducing errors via reverse spelling check 10 so that another source of 'error' may be the drafter's history of errors via a reverse spelling check. Such a mechanism can be defined by a code of a program stored in the non-transitory computer readable medium of the document server that is executable by a processor of the document server. For example, in document applications like Microsoft Word, etc., there is a spelling check that assists the users in correcting their mistakes and typos. Using this mechanism reversely, the document server 2 may identify past incorrectly written words which have been corrected using spelling check by the author or drafter of the document to be reviewed. If such a word-in its correct form is found in the document to be reviewed, then it may be replaced with the uncorrected version of it taken from history as mentioned above. Thereby, the document to be reviewed with its inserted errors can appear to be realistic rather than appearing artificially modified.

Figure 3:
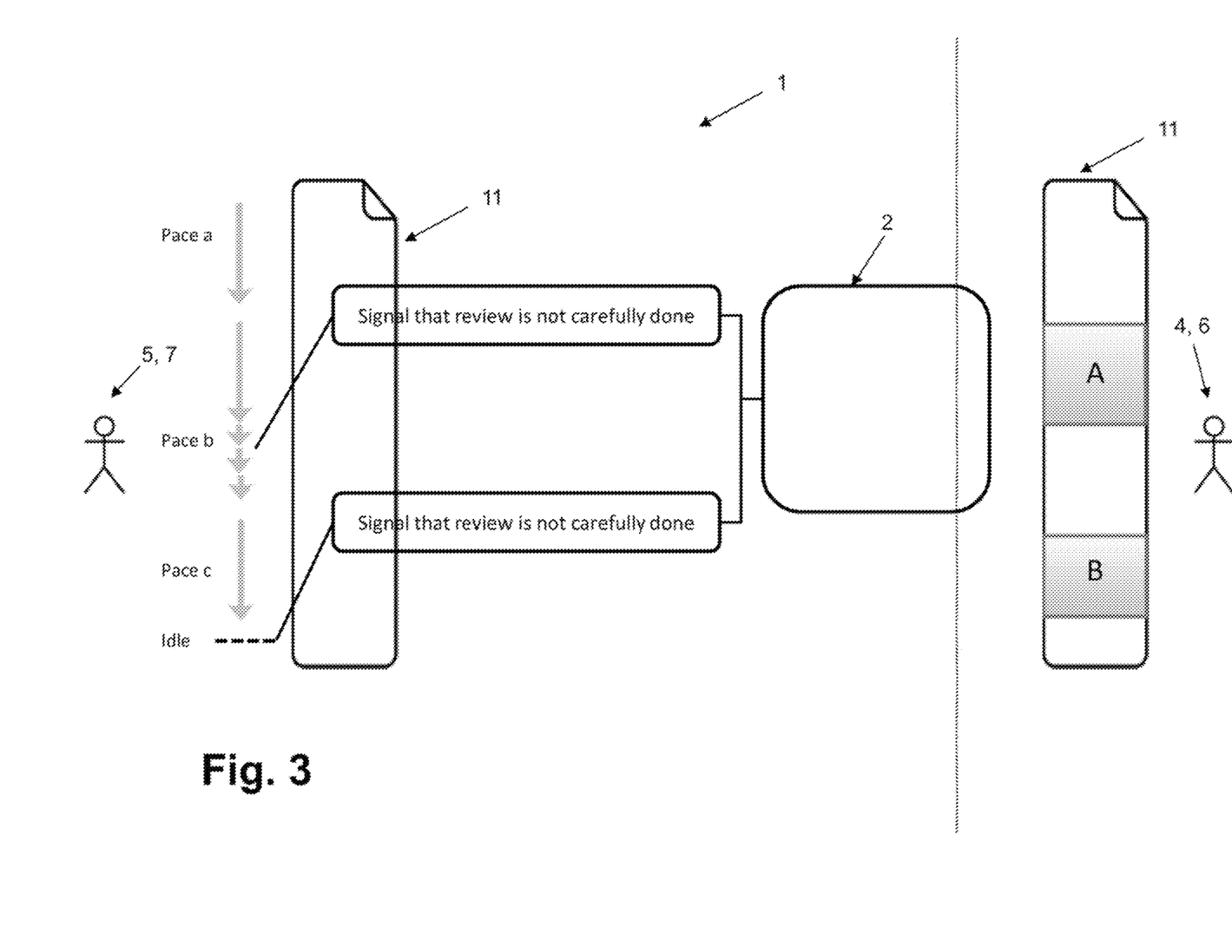
FIG. 3 shows a further schematic overview of an exemplary embodiment of the system for providing information on a review process according to still another embodiment of the invention.

FIG. 3 shows a further schematic overview of an exemplary embodiment of the system for providing information on a review process 1 according to still another embodiment of the invention. This embodiment is based on the assumption that reviewers 7 who have received a document to be reviewed 11 usually read it from start to the end. Accordingly, when the reviewer 7 has reached a pre-selected portion of the document to be reviewed 11 (e.g. for example 40% of the document to be reviewed) via his or her second client 5, then this information is sent to the document server 2 in order to notify that 40% of the text of the document to be reviewed 11 has been processed. The pre-selected portion can be based on the number of pages or the number of words that have been reviewed in some embodiments.

If a reviewer 7 is not diligent and reads the document to be reviewed 11 only diagonally or just skims over it, the document server 2 can be adapted to identify that this reviewer 7 has not read the document to be reviewed 11 carefully and signals this to the first client 4 so that the author of the document to be reviewed 11 is aware of this.

In order to make such a determination as outlined above, the pace of reading the document is detected, for example, by a reading pace detector (not shown). The reading pace detector can determine or calculate in lines per second (lps) the pace of the reading or reviewing of the document to be reviewed 11. If the reviewer 7 has a pace of review via the second client 5 that is below a certain predetermined threshold that may be set manually or automatically based on historical data, then the document server 2 will detect that the reviewer 7 reads the text carefully. If this threshold is exceeded, then the document server 2 can determines that the document to be reviewed 11 has not been read carefully and will inform the author accordingly. The data with respect to the reading pace can be collected continuously while the reviewer 7 performs the reading via the second client 5, and a correspondingly, the evaluation on the quality of the review process can be made continuously via the connection the second client 5 has to the document server 2.

On the other hand, in case the reviewer 7 stays on a page of the document to be reviewed 11, for example, without scrolling for an extremely long time period which is predefined (e.g. no scrolling of the document to be reviewed via the second client occurs for 2 mins, 3 mins, 5 mins, 10 mins, etc.), this is considered to indicate that the reviewer 7 again is not reading carefully, because the document to be reviewed 11 has been left idle without a reviewer 7 working on it, for example, by scrolling within the text or by making corrections or by adding comments.

The data of the reading pace can be collected continuously by the document server 2 via its connection to second clients 5 as well as the evaluation of the latter is made continuously during the review process in real-time from all reviewers 7 (in case of multiple reviews). The result of the evaluation will also be presented to the author 6 in real-time via the first client 4 so that he or she will be able to follow the course of processing of his or her document to be reviewed 11 and to draw conclusions on the quality of the review process. The results of the evaluation can be provided so that the first client 4 generates a display on a display or provides some other type of indication (e.g. audible tone, audio output providing a summary of evaluation results, etc.).

Figure 4:
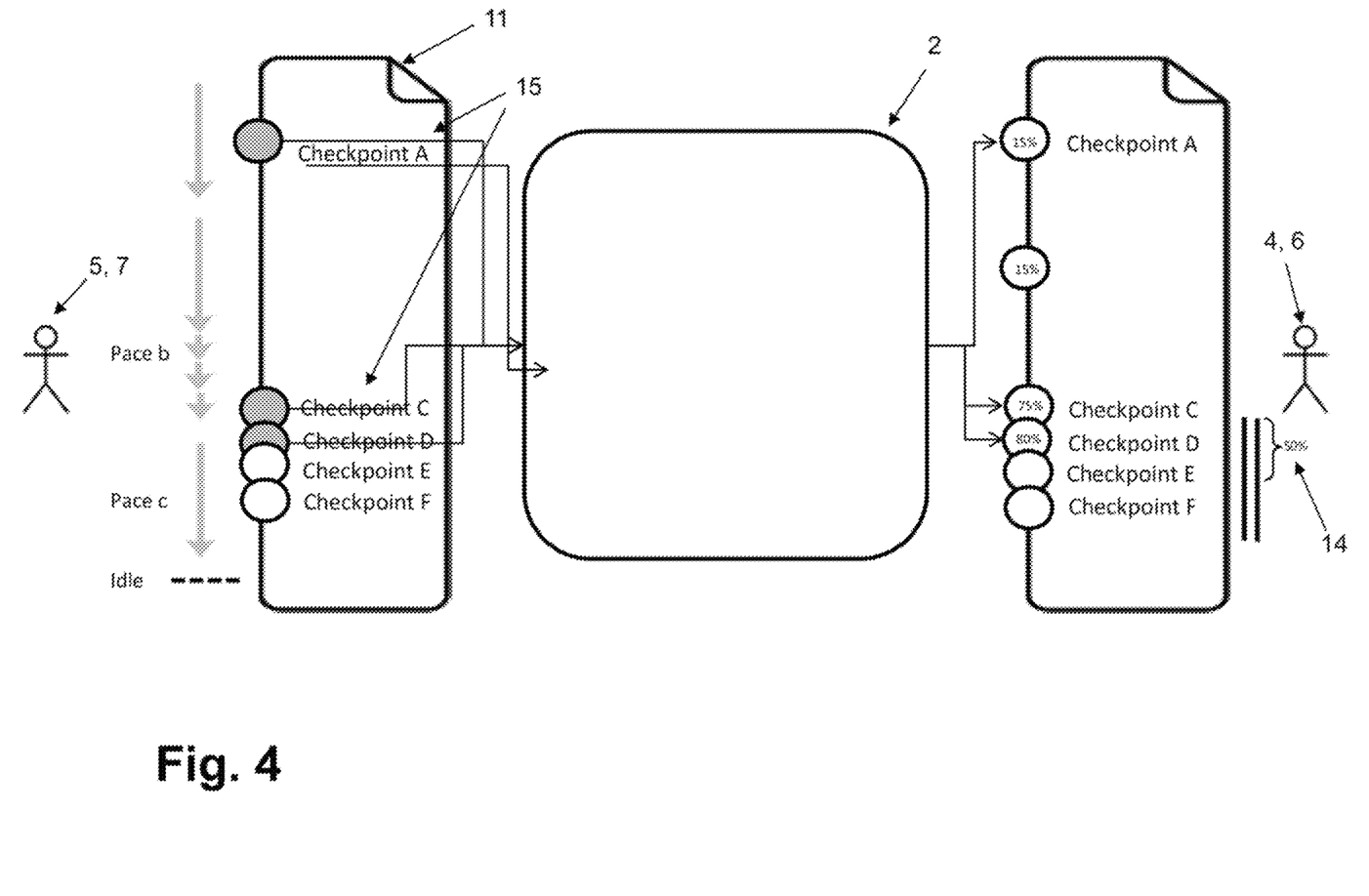
FIG. 4 shows a further schematic overview of an exemplary embodiment of the system for providing information on a review process according to still another embodiment of the invention.

FIG. 4 shows a further schematic overview of the system for providing information on a review process 1 according to still another embodiment of the invention. According to this embodiment, the reading status of a document to be reviewed is determined on the basis of scroll bars 13. Also, in many applications there percentage indicators are used for indicating the reading status, as indicated by reference numeral 14 in the figure. For example, whenever the reader or reviewer 7 scrolls up or down in the text of the document to be reviewed 11 via his or her second client 5, this represents the actual reading status within the document to be reviewed 11. For example, the percentage of the reading status may be shown constantly as the user or reviewer 7 changes pages. From the procedures outlined above, indications of the progress of reading of the document to be reviewed 11 are obtained which then may be transmitted back from the second client 5 to document server 2. The document server 2 then notifies the first client 4, and thus, the author that the review has been progressed to a certain level. Moreover, this data may also be stored in the document server 2.

In case several reviewers 7 have been selected for the review process and are involved, the reading status may be collected and updates on the reading status may be provided for every single reviewer 7 via that reviewer's second client 5 and the second client's connection to the document server 2, whereby only a total status of all reviewers 7 will be provided to the author 6 of the document to be reviewed 11 via the author's first client 4.

Also, the document review percentage status may be collected and displayed, for example, in case a number of reviewers 7 are working online on a document to be reviewed 11 in real-time. For example, as the reviewer or reviewers 7 go through the document to be reviewed 11, she or he makes changes and/or additions. This is done at a certain point or certain points in the document to be reviewed 11. Whenever changes made in the document to be reviewed 11 are detected by the document server 2, a status update can be sent to the first client 4 concerning the location within the document 11 where the reviewer 7 has inserted the amendment via their second client 5. Again, for multiple reviewers 7. the status can be consolidated to one single value by the document server to present this value to the author 6 of the document to be reviewed 11 via their first client 4 and its connection to the document server 2.

There also may be cases of the reviewer 7 not adding the comments in a consecutive serial manner but rather randomly as to the server order. Therefore, it could be difficult for the document server 2 to identify the actual status of the review. In this case, however, the coverage of the document comments may be used as an indicator for the percentage of completion of the review process.

The list of intentional errors mentioned above may be utilized in order to compute the percentage of review completion per page. The changes/comments added by the reviewer are checked against the list of intentional errors. If more than a given percentage (e.g., default 50%) of the list of intentional errors is identified by the reviewer, the page is considered as being partially reviewed. The document server 2 can be configured so that only partially reviewed pages contribute to the overall document review percentage with their respective amount of reviewed intentional errors. For such embodiments, pages of the document to be reviewed 11 with little additions/edits with an error identification rate less than the given percentage may not considered as having been reviewed and the overall document review percentage is not affected by them.

Also, according to this embodiment, so-called checkpoint tags 15 can be employed which may be added by the author 6 of the document to be reviewed 11 via that author's first client 4 and its connection to the document server 2. Thus, when the reviewer 7 encounters such a checkpoint tag 15, then the latter may be switched on automatically or manually, thereby, sending a confirmation back to the author 6 concerning the quantitative status of the review process immediately as having reached that particular checkpoint tag 15 or checkpoint tag location in the document to be reviewed 11.

The checkpoint tags 15 may be set by the author 6 at different locations within the document to be reviewed 11 via the first client 4. Also, setting of the checkpoint tags 15 at various specific locations may be used so as to provide a ranking as to the importance of the review at different passages of the text within the document to be reviewed 11. For example, the author 6 may set more checkpoint tags 15 at a section in the document to be reviewed 11 which is important to be read, and fewer (or none) in a section where reviewing is not required or is less important.

The checkpoint tags 15 may also be activated and de-activated by the reviewer 7. For instance, the reviewer 7 may de-activate a checkpoint 15, if she or he considers this checkpoint tag 15 to have been set erroneously or should be reconsidered by the author 6. The checkpoint tags 15 may be configured and defined in the document to be reviewed 11 so that the checkpoint tags 15 are either visible in a static manner, or may appear as a pop-up whenever the reviewer 7 encounters a specific point under specific circumstances (for instance, she or he has reached that point with a slow scroll pace and not by means of fast scrolling up to that point). In other embodiments, the checkpoint tags 15 may not be visible and be set to be hidden so that the reviewer is unable to know of reaching a checkpoint tag when reviewing the document to be reviewed via his or her second client 5.

In the following, an exemplary procedure of displaying the status of a review process on the basis of checkpoint tags 15 set in the document to be reviewed 11 is described. Here, the author has set a number of checkpoint tags 15, indicated individually by the letters A and B in the document to be reviewed 11 shown in FIG. 3 and by the references "Checkpoint A", "Checkpoint C", "Checkpoint D", "Checkpoint E", and "Checkpoint F" in the document to be reviewed 11 shown in FIG. 4. The author 6 considers the section at checkpoints C, D, E, and F as being very significant and thus, has set a lot of checkpoint tags 15 in this section. The document server 2 then makes the document to be reviewed 11 available for review to the reviewer 7 by providing access to the second client 5. The reviewer 7 reads the document to be reviewed 11 at standard pace via the second client 5 until he or she reaches checkpoint A. At "Checkpoint A", an indication appears in the document to be reviewed 11 via a display of the second client 5 of the reviewer 7 which will be checked by the reviewer 7 providing input via the second client 5. Then, the author 6 is notified, by the document server 2, that checkpoint A has been reached, meaning in this case that 15% of the document has been reviewed. The reviewer 7 then reads in a very fast pace until reaching checkpoint B so that checkpoint B will not appear or be visible in the document to be reviewed 11. Then, the reviewer 7 reads the next passage in a slower manner (i.e. reviewer reads it carefully) until he or she reaches checkpoint C and "Checkpoint C" will appear in the document to be reviewed 11. The reviewer 7 then checks it and, again, this information is transmitted from the document server 2 to the first client 4, and thus, to the author 6 of the document to be reviewed 11. The same procedure applies for checkpoint D, and then, at checkpoint D, the reviewer 7 will stop reading the document to be reviewed 11. The author 6 is notified that 80% of the document 11 has been reviewed and the significant part has been reviewed about 50% based on the number of checkpoint tags 15 that have been actuated during the review within the section of the document to be reviewed 11 determined to be the significant part of that document (e.g. by input the author previously provided via the first client 4 and/or the number or density of checkpoint tags 15 at this section relative to other sections, etc.).

Figure 5:
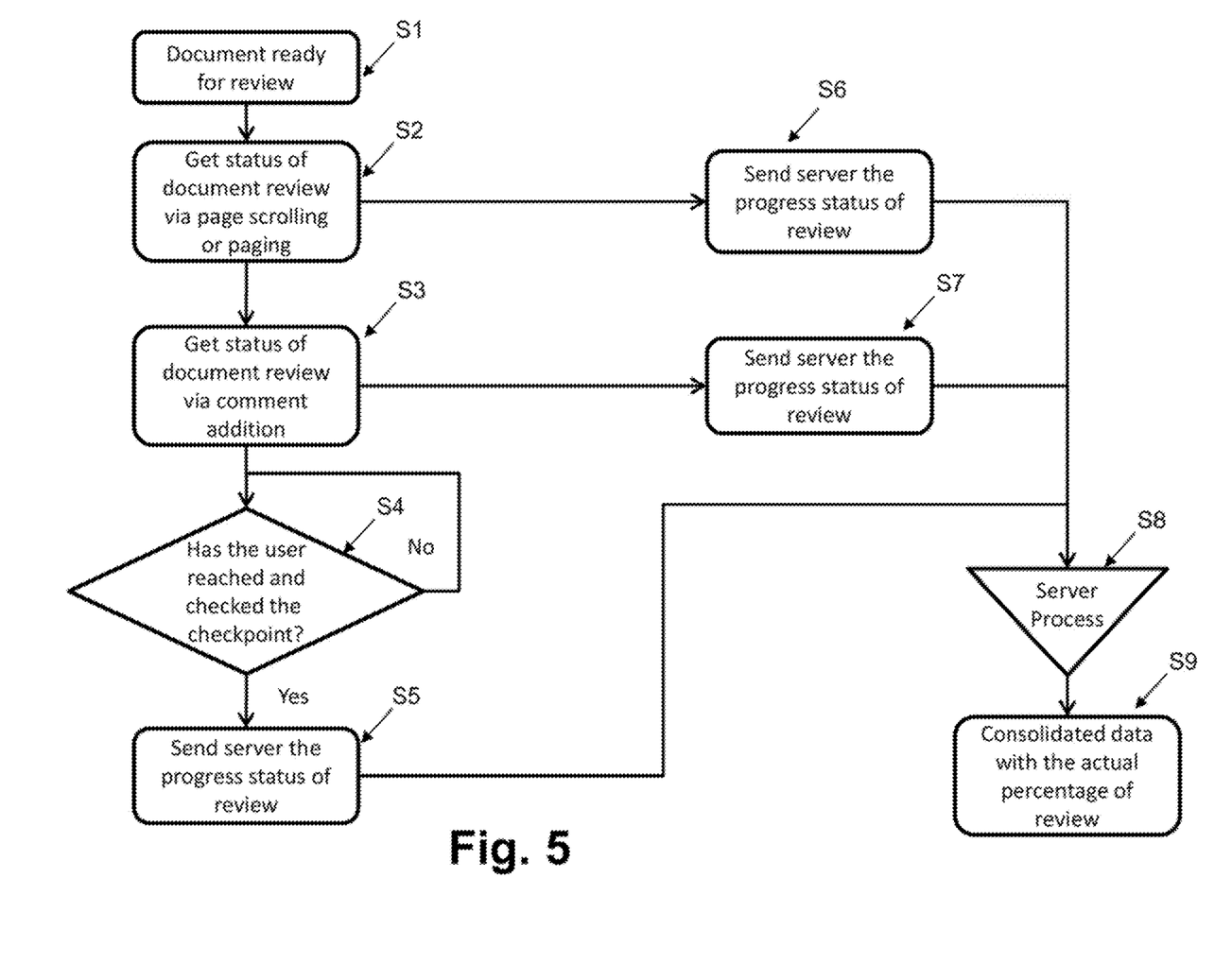
FIG. 5 is a flow chart of an exemplary review process according to an embodiment of the invention.

FIG. 5 is a flow chart of an exemplary review process according to an embodiment of the invention. In a first step S1, the document to be reviewed is ready for review so that the review process may start. In a subsequent step S2, the status of the document to be reviewed is determined via page scrolling or paging via the second client 5. Then, the procedure continues either by sending the document server 2 a notification on the progress of the status of the review process (step S6) by the second client 5, or by further determining the status of the document to be reviewed 11 by means of comments added in the text of the document to be reviewed 11 (step S3). Here, again, the procedure may either continue by sending the progress status of the review process to the document server 2 via the second client 5 (step S7), or by verifying whether the reviewer has reached and checked the checkpoint in the text of the document to be reviewed (step S4), followed by a step S5 of sending the document server 2 the progress status of the review process. All steps S5, S7, and S6 are commonly followed by a step of server processing (S8) and consolidating data with the actual percentage of the review process (step S9) representing the end of this exemplary procedure. It should be appreciated that the connections between the second client(s) 5 and the document server 2 and the connection between the first client 4 and the document server 2 can facilitate the monitoring of the review process and communication of indications related to the status of the review process.

It should be appreciated that different changes can be made to embodiments of the method, communication apparatus, and system to meet different sets of design criteria. For instance, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a system, a communication apparatus, and methods of making and using the same have been shown and described above, it is to be distinctly understood that the invention is not limited thereto but may be otherwise variously embodied and practiced within the scope of the following claims.

What is claimed is:

1. A computer-implemented method for providing a review process of a document, which is provided by first client to at least one second client via a document server, the document server comprising a central documentation system enabling document collaboration, the document server connectable to the first client via a communication network, the document server connectable to the at least one second client via the communication network, the method comprising:

receiving, at the document server, a document to be reviewed from the first client, the document server comprising a processor connected to a non-transitory computer readable medium;

processing of the document to be reviewed, by the document server, the processing of the document to be reviewed including creating a copy of the document to be reviewed, and modifying the copy so the copy is a modified copy that includes at least one of predetermined typos and predetermined-grammar errors, wherein the at least one of the predetermined typos and the predetermined grammar errors are generated based on a reverse spelling check of the document to be reviewed performed by the document server, wherein the document server identifies past incorrectly written words automatically corrected by using a spelling check feature via the first client, and wherein the document server, when modifying the copy of the document to be reviewed, replaces one or more of the words automatically corrected by using the spelling check feature with erroneous words that had been automatically corrected via the spell check feature to form the modified copy of the document to be reviewed;

providing, by the document server, access to the modified copy of the document to be reviewed by the second client so as to start a review process for reviewing the document to be reviewed;

checking changes made to the modified copy of the document communicated by the second client to update the document to be reviewed so that the changes made to the modified copy communicated by the second client for the at least one of the predetermined typos and the predetermined grammar errors are not made to the document to be reviewed and the changes made to the modified copy of the document communicated by the second client that are not part of the at least one of the predetermined typos and the predetermined grammar errors are made in the document to be reviewed to update the document to be reviewed;

evaluating, by the document server, a quality of the review process, wherein the evaluating, by the document server, of the quality of the review process for the document to be reviewed is based on both of (i) the changes made to the modified copy of the document communicated by the second client for the at least one of the predetermined typos and the predetermined grammar errors and (ii) a detected reading pace for the review of the modified copy of the document; and providing information on the evaluated quality of the review process to the first client.

2. The computer-implemented method of claim 1, wherein the providing access to the modified copy of the document to be reviewed includes receiving log-in data from the second client so as to log into the document server for accessing the modified copy of the document to be reviewed and starting the review process.

3. The computer-implemented method of claim 1, comprising:

monitoring, by the document server, a status of the review process being performed via the second client; and communicating the status of the review process to the first client based on the monitoring of the status of the review process being performed via the second client.

4. The computer-implemented method of claim 3, wherein the evaluating, by the document server, the quality of the review process comprises the document server evaluating the quality of the review process by determining at least one of a number of typos detected and corrected in the modified copy via the second client and a number of grammar errors detected and corrected in the modified copy via the second client.

5. The computer-implemented method of claim 4, wherein the at least one of the predetermined typos and the predetermined grammar errors also include predetermined typos and predetermined grammar errors that are generated randomly by the document server.

6. The computer-implemented method of claim 1, wherein the evaluating the quality of the review process comprises determining a pace of reading of a reviewer of the document to be reviewed at the second client.

7. The computer-implemented method of claim 6, wherein the document server compares the pace of reading with a predetermined range of values for the pace of reading, and upon a determination that the pace of reading lies within the predetermined range, then the quality of the review process is determined have a first level of quality, and upon a determination that the pace of reading lies outside of the predetermined range, then the quality of the review process is determined to have a second level of quality that differs from the first level of quality.

8. The computer-implemented method of claim 1, wherein the quality of the review process is determined continuously during the review process, the method also comprising:

the document server communicating a result of the determination of the quality of the review process to the first client in real-time.

9. The computer-implemented method of claim 1, comprising:

determining a reading status, by the document server, during the review process, and the document server communicating with the first client to indicate the reading status at the first client.

10. The computer-implemented method of claim 9, wherein the determining of the reading status is carried out based on the position of a scroll bar at a display of the second client indicating a position in the modified copy of the document to be reviewed.

11. The computer-implemented method according to claim 1, wherein the modified copy of the document to be reviewed includes checkpoint tags for indicating a quantitative status of the review process for the document to be reviewed; and at least one of:

the providing of the information on the evaluated quality of the review process to the first client is based on activation of at least one of the checkpoint tags received at the document server, and the evaluating of the quality of the review process is based on activation of at least one of the checkpoint tags received at the document server.

12. A system for providing information on a review process of a document, the system comprising:

a document server comprising a processor connected to a non-transitory computer readable medium, the document server configured to enable document collaboration, the document server being connectable via a communications network to a first client, the document server also being connectable via the communications network to a second client, the document server configured to receive a document to be reviewed from the first client and process the document to be reviewed to create a modified copy of the document to be reviewed that includes at least one of predetermined typos and predetermined-grammar errors, wherein the at least one of the predetermined typos and the predetermined grammar errors are generated based on a reverse spelling check of the document to be reviewed performed by the document server, wherein the document server identifies past incorrectly written words automatically corrected by using a spelling check feature via the first client, and wherein the document server, when modifying the copy of the document to be reviewed, replaces one or more of the words automatically corrected by using the spelling check feature with erroneous words that had been automatically corrected via the spell check feature to form the modified copy of the document to be reviewed;

the document server configured to permit the second client to access the modified copy of the document to be reviewed by the second client so as to start a review process for reviewing the document to be reviewed;

the document server configured to check changes made to the modified copy of the document communicated by the second client to update the document to be reviewed so that the changes made to the modified copy of the document communicated by the second client for the at least one of the predetermined typos and the predetermined grammar errors are not made to the document to be reviewed and the changes made to the modified copy of the document communicated by the second client that are not part of the at least one of the predetermined typos and the predetermined grammar errors are made in the document to be reviewed to update the document to be reviewed;

the document server configured to determine a quality of the review process performed via the second client based on both of (i) the changes made to the modified copy of the document communicated by the second client for the at least one of the predetermined typos and the predetermined grammar errors and (ii) a detected reading pace for the review of the modified copy of the document; and the document server configured to transmit information related to the evaluated quality of the review process to the first client.

13. The system of claim 12, wherein the determination of the quality of the review process is based on an extent to which the at least one of the predetermined typos and the predetermined grammar errors included in the modified copy are corrected via the second client during the review process.

14. The system of claim 12, wherein
the document server is configured to compare the pace of reading with a predetermined range of values for the pace of reading, and upon a determination that the pace of reading lies within the predetermined range, the quality of the review process is determined have a first level of quality, and upon a determination that the pace of reading lies outside of the predetermined range, the quality of the review process is determined to have a second level of quality that differs from the first level of quality.

15. A communication apparatus comprising:
a document server comprising a processor connected to a non-transitory computer readable medium, the document server configured to enable document collaboration,
the document server being connectable via a communications network to a first client, the document server also being connectable via the communications network to a second client, the document server configured to receive a document from the first client,
the document server is configured to process the document to be reviewed that is received from the first client by creating a copy of the document to be reviewed and modifying the copy so the copy is a modified copy that includes at least one of predetermined typos and predetermined grammar errors, wherein the at least one of the predetermined typos and the predetermined grammar errors are generated based on a reverse spelling check of the document to be reviewed performed by the document server, wherein the document server identifies past incorrectly written words automatically corrected by using a spelling check feature via the first client, and wherein the document server, when modifying the copy of the document to be reviewed, replaces one or more of the words automatically corrected by using the spelling check feature with erroneous words that had been automatically corrected via the spell check feature to form the modified copy of the document to be reviewed;
the document server configured to permit the second client to access the modified copy so as to start a review process for reviewing the document to be reviewed;
the document server configured to check changes made to the modified copy of the document communicated by the second client to update the document to be reviewed so that the changes made to the modified copy of the document communicated by the second client for the at least one of the predetermined typos and the predetermined grammar errors are not made to the document to be reviewed and the changes made to the modified copy of the document communicated by the second client that are not part of the at least one of the predetermined typos and the predetermined grammar errors are made in the document to be reviewed to update the document to be reviewed;
the document server configured to determine a quality of the review process performed via the second client based on both of (i) the changes made to the modified copy of the document communicated by the second client for the at least one of the predetermined typos and the predetermined grammar errors and (ii) a detected reading pace for the review of the modified copy of the document; and
the document server configured to transmit information related to the evaluated quality of the review process to the first client.

16. The communication apparatus of claim 15, wherein the document server is also configured
to compare the pace of reading with a predetermined range of values for the pace of reading, and upon a determination that the pace of reading lies within the predetermined range, the quality of the review process is determined have a first level of quality, and upon a determination that the pace of reading lies outside of the predetermined range, the quality of the review process is determined to have a second level of quality that differs from the first level of quality.

* * * * *